US012798990B2

(12) United States Patent

Xiao et al.

(10) Patent No.: US 12,798,990 B2

(45) Date of Patent: Nov. 17, 2026

(54) PREPARATION METHOD AND APPLICATION METHOD OF CARBON-FREE $Fe_7Se_8$-BASED $Na^+$-STORAGE ELECTRODE MATERIAL

(71) Applicant: Beijing University of Chemical Technology, Beijing (CN)

(72) Inventors: Ying Xiao, Beijing (CN); Yue Miao, Kelamayi (CN); Shilin Hu, Liaoyang (CN); Shimou Chen, Beijing (CN); Fenglian Gong, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 541 days.

(21) Appl. No.: 18/496,877

(22) Filed: Oct. 29, 2023

(65) Prior Publication Data

US 2025/0136464 A1 May 1, 2025

(51) Int. Cl.
*H01M 4/04* (2006.01)
*C01G 49/00* (2006.01)
(Continued)

(52) U.S. Cl.
CPC ........ *C01G 49/009* (2013.01); *H01M 4/0404* (2013.01); *H01M 4/622* (2013.01);
(Continued)

(58) Field of Classification Search
CPC .... H01M 4/0404; H01M 4/622; H01M 4/625; H01M 10/054; H01M 4/0471; H01M 4/136; H01M 4/1397; H01M 4/5825
See application file for complete search history.

(56) References Cited

FOREIGN PATENT DOCUMENTS

CN 115321503 A * 11/2022 .......... H01M 4/5825

OTHER PUBLICATIONS

English machine translation of CN 115321503 A (Year: 2022).*

* cited by examiner

*Primary Examiner* — Keith Walker
*Assistant Examiner* — Steven S Ha
(74) *Attorney, Agent, or Firm* — Hemisphere Law, PLLC

(57) ABSTRACT

A preparation method of a carbon-free $Fe_7Se_8$-based electrode material for $Na^+$-storage anode and its application are provided. The presented method includes: dissolving ferric chloride and ammonium dihydrogen phosphate in deionized water at a room temperature, then stirring and transferring into an autoclave to perform the hydrothermal reaction, obtaining a spindle-shaped $Fe_2O_3$ after washing and drying processes; grinding and mixing the prepared $Fe_2O_3$ with a selenium powder combined with the sodium hypophosphite hydrate, which are placed in the different regions of a tube furnace. After heating treatment, the $Fe_7Se_8/Fe_3(PO_4)_2$ $Na^+$-storage anode is obtained. The material prepared by the proposed method is applied as a highly efficient $Na^+$-storage anode with long cycle stability and high-rate performance, effectively avoiding the crushing of active components caused by the large volume expansion of the electrode in the charging/discharging process, and improving the cycle life of the battery.

8 Claims, 7 Drawing Sheets

(51) Int. Cl.
*H01M 4/62* (2006.01)
*H01M 10/054* (2010.01)
*H01M 4/02* (2006.01)

(52) U.S. Cl.
CPC ......... *H01M 4/625* (2013.01); *H01M 10/054* (2013.01); *C01P 2002/72* (2013.01); *C01P 2002/85* (2013.01); *C01P 2004/03* (2013.01); *H01M 2004/027* (2013.01)

PREPARATION METHOD AND APPLICATION METHOD OF CARBON-FREE $Fe_7Se_8$-BASED $Na^+$-STORAGE ELECTRODE MATERIAL

TECHNICAL FIELD

The disclosure relates to the technical field of electrode materials of sodium-ion ($Na^+$) batteries, particularly to a preparation method and an application method of a carbon-free $Fe_7Se_8$-based $Na^+$-storage electrode material.

BACKGROUND

With a rapid growth of people's demand for lithium batteries, the scarcity of lithium resources on earth and the accompanied high cost on manufacturing the lithium batteries hinders their large-scale application. $Na^+$ batteries are regarded as the most competitive alternatives for the lithium batteries because of their wide resource distribution, electrochemical stability, high safety, and energy storage mechanism similar to the lithium batteries. Therefore, the $Na^+$ batteries have attracted wide attention and shown great potential in large-scale energy storage fields, such as low-speed electric vehicles, household power grids, backup power supplies, and fifth generation (5G) base stations.

However, the sodium ion ($Na^+$) is greater in its radius, resulting in that an electrode material containing the sodium ion generate a large volume variation and a slow diffusion rate during repeated sodium intercalation/deintercalation in the electrode material, thereby leading to a short service life and a poor rate capability of the $Na^+$ battery. Therefore, it is imperative to explore improved electrode materials that can achieve fast $Na^+$ diffusion kinetics and have good structural stability. At present, iron selenide has advantages of high natural abundance, good redox reversibility, and high theoretical capacity, which is considered to be an attractive $Na^+$-storage anode. However, it is still a tricky challenge to prepare a carbon-free iron selenide anode with long-term stability and high-rate capability.

SUMMARY

Objectives of the disclosure are to overcome problems of volume expansion, easy collapse of a structure, and slow diffusion kinetics of sodium ions in charging and discharging processes of an iron selenide electrode material in an existing $Na^+$ battery, and to provide a preparation method and an application method of a carbon-free $Fe_7Se_8$-based $Na^+$-storage electrode material, which can obtain an efficient $Na^+$-storage anode material with long cycling stability and high-rate capability.

In order to achieve the above objectives, the disclosure adopts the following technical solution: a preparation method of a carbon-free $Fe_7Se_8$-based $Na^+$-storage electrode material, including the following steps:

step 1, dissolving ferric chloride and ammonium dihydrogen phosphate in deionized water at a room temperature to get a mixed solution, stirring the mixed solution to obtain a clear yellow liquid, transferring the clear yellow liquid into an autoclave and performing a hydrothermal reaction on the clear yellow liquid at 120 degrees Celsius (° C.) to 160° C. to obtain a powder, naturally cooling the powder to the room temperature followed by washing and drying, thereby to obtain a spindle-shaped ferric oxide ($Fe_2O_3$) powder; and step 2, grinding and mixing the spindle-shaped $Fe_2O_3$ powder prepared in the step 1 with a selenium powder to obtain a mixed powder; placing the mixed powder and sodium hypophosphite monohydrate ($NaH_2PO_2 \cdot H_2O$) in a middle region and a front region of a tube furnace respectively, where a placement distance between the mixed powder and the sodium hypophosphite monohydrate in the tube furnace is in a range of 6 centimeters (cm) to 15 cm, and a mass ratio of the spindle-shaped $Fe_2O_3$ powder: the selenium powder: the sodium hypophosphite monohydrate is 1:(2-3):(5-6); and performing calcination treatment on the mixed powder and the sodium hypophosphite monohydrate in an inert atmosphere by heating the mixed powder and the sodium hypophosphite monohydrate from an initial temperature of 25° C. to a calcination temperature of 600° C.-800° C. and maintaining the calcination temperature, thereby to obtain the carbon-free $Fe_7Se_8$-based $Na^+$-storage electrode material (i.e., a $Fe_7Se_8/Fe_3(PO_4)_2$ sample).

In an embodiment, in the step 2, the mass ratio of the spindle-shaped $Fe_2O_3$ powder: the selenium powder: the sodium hypophosphite monohydrate is 1:2:5.

In an embodiment, in the step 2, the calcination temperature is 600° C., a heating speed of the calcination treatment is in a range of 2-5 degrees Celsius per minute (° C./min), and a time for maintaining the calcination temperature is in a range of 2-4 hours (h).

In an embodiment, in the step 1, a molar concentration ratio of the ferric chloride to the ammonium dihydrogen phosphate is 400:9.

In an embodiment, in the step 1, a reaction time for the hydrothermal reaction at 120° C. to 160° C. is in a range of 3-8 h, a temperature for the drying is 70° C., and a time for the drying is 12 h.

In an embodiment, in the step 1, a temperature for the hydrothermal reaction is 140° C., and the reaction time for the hydrothermal reaction is 5 h.

In an embodiment, in the step 1, the washing after the hydrothermal reaction and the naturally cooling the powder to the room temperature is performed by sequentially washing the powder using deionized water and ethanol.

In an embodiment, in the step 2, the prepared carbon-free $Fe_7Se_8$-based $Na^+$-storage electrode material has a three-dimensional interconnected porous frame and a phosphorus-selenium (P—Se) bond-rich heterogeneous structure.

The carbon-free $Fe_7Se_8$-based $Na^+$-storage electrode material prepared in the step 2 of the preparation method is applied in a sodium battery, including the following steps:

using the carbon-free $Fe_7Se_8$-based $Na^+$-storage electrode material prepared in the step 2 as an active material of the sodium battery, using a carbon nanotube as a conductive agent, using sodium carboxymethyl cellulose as a binder, and using water as a solvent;

grinding the carbon-free $Fe_7Se_8$-based $Na^+$-storage electrode material, the carbon nanotube, the sodium carboxymethyl cellulose, and the water into a paste;

uniformly coating the paste on a copper foil current collector and then vacuum drying the paste; and using the paste after the vacuum drying as an anode of the sodium battery, and assembling the anode with a sodium metal and an organic liquid electrolyte, thereby to obtain a $Na^+$ half-cell battery.

Beneficial effects of the disclosure are as follows.

1. The carbon-free $Fe_7Se_8$-based $Na^+$-storage electrode material prepared by the current method has a three-dimensional (3D) interconnected porous frame and a phosphorus-selenium (P—Se) bond-rich heterogeneous structure; the 3D interconnected porous frame can promote rapid transmission of sodium ions and electrons, thereby facilitating permeation of the organic liquid electrolyte; and the P—Se bond-rich heterogeneous structure endows the iron selenide electrode material with excellent mechanical stability in sodium intercalation/deintercalation, and can reduce diffusion energy barrier of the sodium ions and improve the charge migration efficiency. Therefore, the synergistic effect between the 3D interconnected porous frame and the phosphorus-selenium (P—Se) bond-rich heterogeneous structure enhances electronic conductivity and the reaction kinetics, thereby obtaining excellent long cycle stability and high-rate capacity.

2. In the preparation method of the disclosure, by using the simple hydrothermal reaction and the calcination treatment, the carbon-free $Fe_7Se_8$-based $Na^+$-storage electrode material including the P—Se bond-rich heterogeneous structure is obtained. Furthermore, by constructing the P—Se bond-rich heterogeneous structure, the structural stability of the carbon-free $Fe_7Se_8$-based $Na^+$-storage electrode material is enhanced, which provides a new strategy to design other carbon-free electrode materials with a high tap density.
3. Electrochemical properties of the prepared carbon-free $Fe_7Se_8$-based $Na^+$-storage electrode material are tested, and the related experimental results show that the carbon-free $Fe_7Se_8$-based $Na^+$-storage electrode material has good electrochemical properties. Under a high current density of 5 ampere per gram ($A \cdot g^{-1}$), a specific capacity of the $Na^+$ half-cell battery reaches 266.9 mAh (referred as to a unit of measurement for a battery capacity) per gram ($mAh \cdot g^{-1}$) after 1500 times cycles, which is superior to some of existing carbon-coated selenide electrode materials.
4. The preparation method adopted by the disclosure is operated simply, low in cost, and easy to produce in batches; and the prepared electrode material is carbon free, thereby efficiently improving the tap density of the electrode material and the energy density of the $Na^+$ half-cell battery.

DETAILED DESCRIPTION OF EMBODIMENTS

Figure 1:
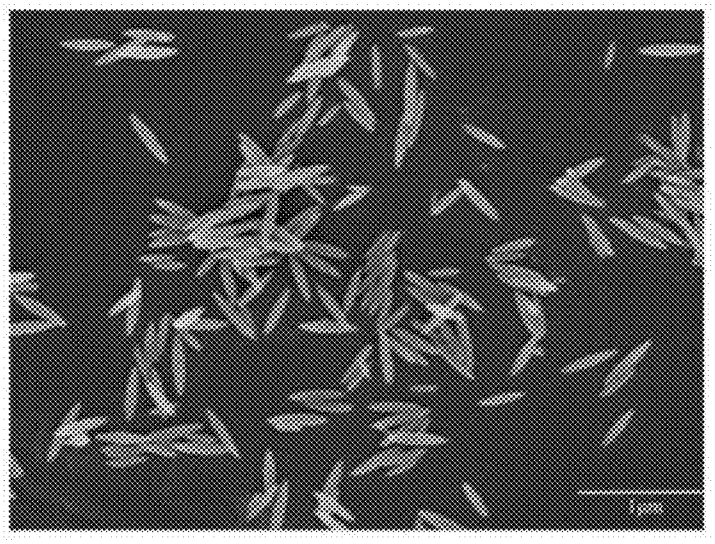
FIG. 1 illustrates a scanning electron microscopy (SEM) image of a ferric oxide ($Fe_2O_3$) powder prepared in an embodiment 1 of the disclosure.

The disclosure will be further explained below with reference to the attached drawings and illustrated embodiments.

Embodiment 1: The disclosure provides a preparation method of a carbon-free $Fe_7Se_8$-based sodium-ion ($Na^+$)-storage electrode material, including the following steps:

step 1, dissolving 0.3784 gram (g) of ferric chloride and 0.0036 g of ammonium dihydrogen phosphate in 70 milliliters (mL) of deionized water at a room temperature to obtain a mixed solution, stirring the mixed solution to obtain a clear yellow liquid, transferring the clear yellow liquid into an autoclave and performing a hydrothermal reaction on the clear yellow liquid at 140 degrees Celsius (C) for 5 hours (h) to obtain a powder, naturally cooling the powder to the room temperature, followed by washing it by using deionized water and ethanol sequentially, and then drying the powder at 70° C. for 12 h, thereby to obtain a spindle-shaped ferric oxide ($Fe_2O_3$) powder; and step 2, grinding and mixing the spindle-shaped $Fe_2O_3$ powder prepared in the step 1 with a selenium powder to get a mixed powder; placing the mixed powder and sodium hypophosphite monohydrate ($NaH_2PO_2 \cdot H_2O$) in a middle region and a front region of a tube furnace respectively, where a placement distance between the mixed powder and the sodium hypophosphite monohydrate in the tube furnace is 10 centimeters (cm), and a mass ratio of the spindle-shaped $Fe_2O_3$ powder: the selenium powder: the sodium hypophosphite monohydrate is 1:2:5; and performing calcination treatment on the mixed powder and the sodium hypophosphite monohydrate in an inert atmosphere by heating the mixed powder and the sodium hypophosphite monohydrate from an initial temperature of 25° C. with a heating speed of the calcination treatment of 5 degrees Celsius per minute (C/min) to a calcination temperature of 600° C. and maintaining the calcination temperature at 600° C. for 2 h, finally obtaining the carbon-free $Fe_7Se_8$-based $Na^+$-storage electrode material (i.e., an iron selenide/ferrous phosphate abbreviated as $Fe_7Se_8/Fe_3(PO_4)_2$ sample) of the embodiment 1.

Embodiment 2: Compared with the embodiment 1, differences in the preparation method are as follows:

step 2, grinding and mixing the spindle-shaped $Fe_2O_3$ powder prepared in the step 1 with a selenium powder to get a mixed powder; placing the mixed powder and sodium hypophosphite monohydrate in a middle region and a front region of a tube furnace respectively, where a placement distance between the mixed powder and the sodium hypophosphite monohydrate in the tube furnace is 6 cm; and performing calcination treatment on the mixed powder and the sodium hypophosphite monohydrate in an inert atmosphere by heating the mixed powder and the sodium hypophosphite monohydrate from an initial temperature of 25° C. with a heating speed of the calcination treatment of 2° C./min to a calcination temperature of 600° C. and maintaining the calcination temperature at 600° C. for 2 h, finally obtaining a $Fe_7Se_8/Fe_3(PO_4)_2$ sample of the embodiment 2.

Embodiment 3: Compared with the embodiment 1, differences in the preparation method are as follows:

step 2, grinding and mixing the spindle-shaped $Fe_2O_3$ powder prepared in the step 1 with a selenium powder to get a mixed powder; placing the mixed powder and sodium hypophosphite monohydrate in a middle region and a front region of a tube furnace respectively, where a placement distance between the mixed powder and the sodium hypophosphite monohydrate in the tube furnace is 10 cm; and performing calcination treatment on the mixed powder and the sodium hypophosphite monohydrate in an inert atmosphere by heating the mixed powder and the sodium hypophosphite monohydrate from an initial temperature of 25° C. with a heating speed of the calcination treatment of 2° C./min to a calcination temperature of 600° C. and maintaining the calcination temperature at 600° C. for 4 h, finally obtaining a $Fe_7Se_8/Fe_3(PO_4)_2$ sample of the embodiment 3.

Embodiment 4: Compared with the embodiment 1, differences in the preparation method are as follows:

step 2, grinding and mixing the spindle-shaped $Fe_2O_3$ powder prepared in the step 1 with a selenium powder to get a mixed powder; placing the mixed powder and sodium hypophosphite monohydrate in a middle region and a front region of a tube furnace respectively, where a placement distance between the mixed powder and the sodium hypophosphite monohydrate in the tube furnace is 10 cm; and performing calcination treatment on the mixed powder and the sodium hypophosphite monohydrate in an inert atmosphere by heating the mixed powder and the sodium hypophosphite monohydrate from an initial temperature of 25° C. with a heating speed of the calcination treatment of 2° C./min to a calcination temperature of 600° C. and maintaining the calcination temperature at 600° C. for 2 h, finally obtaining a $Fe_7Se_8/Fe_3(PO_4)_2$ sample of the embodiment 4.

Embodiment 5: Compared with the embodiment 1, differences in the preparation method are as follows:

step 2, grinding and mixing the spindle-shaped $Fe_2O_3$ powder prepared in the step 1 with a selenium powder to get a mixed powder; placing the mixed powder and sodium hypophosphite monohydrate in a middle region and a front region of a tube furnace respectively, where a placement distance between the mixed powder and the sodium hypophosphite monohydrate is in the tube furnace 15 cm; and performing calcination treatment on the mixed powder and the sodium hypophosphite monohydrate in an inert atmosphere by heating the mixed powder and the sodium hypophosphite monohydrate from an initial temperature of 25° C. with a heating speed of the calcination treatment of 3° C./min to a calcination temperature of 600° C. and maintaining the calcination temperature at 600° C. for 3 h, finally obtaining a $Fe_7Se_8/Fe_3(PO_4)_2$ sample of the embodiment 5.

Performance experiments of the $Fe_7Se_8/Fe_3(PO_4)_2$ samples contained in the carbon-free $Fe_7Se_8$-based $Na^+$-storage electrode materials are as follows.

1. The $Fe_2O_3$ powder prepared by the preparation method of the embodiment 1 is scanned by an electron microscope to obtain a scanning electron microscopy (SEM) image as shown in FIG. 1. It can be seen from FIG. 1 that the prepared $Fe_2O_3$ powder displays spindle-shaped particles with a diameter of 300 nanometers (nm) to 500 nm.
2. On a basis that other conditions are not changed, when other samples are prepared according to parameters other than the above-mentioned preparation conditions of the $Fe_7Se_8/Fe_3(PO_4)_2$ samples in the embodiments 1-5, a three-dimensional interconnected porous frame and a phosphorus-selenium (P—Se) bond-rich $Fe_7Se_8/Fe_3(PO_4)_2$ heterogeneous structure cannot be obtained. Therefore, variations of the parameters have great influence on the formation of the final obtained samples. Specially, the preparation conditions of the final obtained samples include: the placement distance between the mixed powder of the spindle-shaped $Fe_2O_3$ powder with the selenium powder and the sodium hypophosphite monohydrate in the tube furnace, which is in a range of 6-15 cm, and the mass ratio of spindle-shaped $Fe_2O_3$ powder: the selenium powder: the sodium hypophosphite monohydrate of 1:(2-3):(5-6).
3. The $Fe_7Se_8/Fe_3(PO_4)_2$ samples contained in the carbon-free $Fe_7Se_8$-based $Na^+$-storage electrode materials prepared by the embodiments 1-5 are subjected to X-ray powder diffraction (XRD) patterns of the samples 1-5. As shown in FIGS. 2A-2E, it can be seen that under the preparation conditions listed in the embodiments 1-5, the carbon-free $Fe_7Se_8$-based $Na^+$-storage electrode materials display a $Fe_7Se_8/Fe_3(PO_4)_2$ heterogeneous structure, respectively.

Figure 2A:
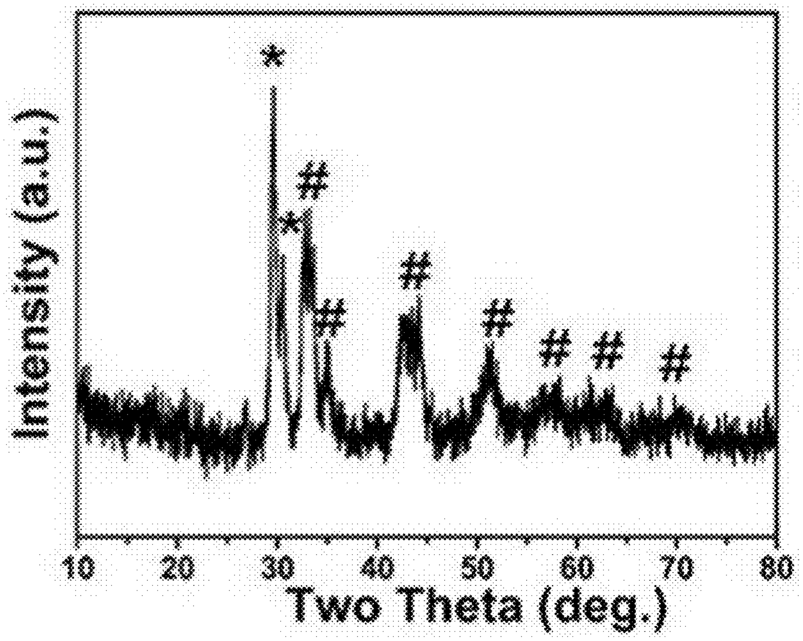
FIG. 2A illustrates an X-ray diffraction (XRD) pattern of an iron selenide/ferrous phosphate ($Fe_7Se_8/Fe_3(PO_4)_2$) sample prepared in the embodiment 1 of the disclosure.
Figure 2B:
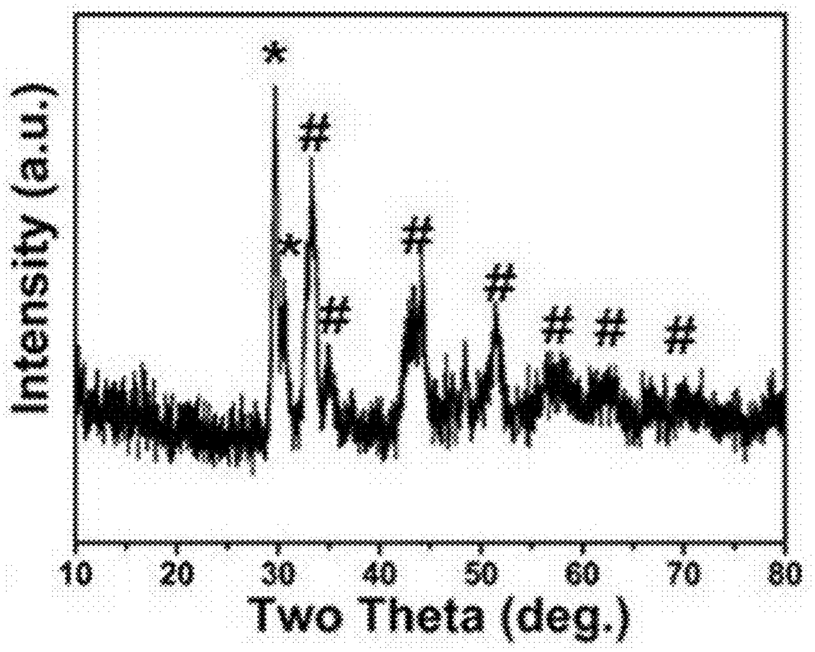
FIG. 2B illustrates an XRD pattern of a $Fe_7Se_8/Fe_3(PO_4)_2$ sample prepared in an embodiment 2 of the disclosure.

As shown in FIG. 2A and FIG. 2B, a * symbol represents the $Fe_3(PO_4)_2$ and a #symbol represents the $Fe_7Se_8$. It can be seen from FIG. 2A and FIG. 2B that the prepared samples contain the $Fe_7Se_8$ and the $Fe_3(PO_4)_2$ that are with poor crystallinity, and there are no peaks belonging to impurity. Moreover, a peak of the $Fe_3(PO_4)_2$ appears on left and is higher than that of the $Fe_7Se_8$. Furthermore, in the $Fe_7Se_8/Fe_3(PO_4)_2$ heterogeneous structure, $Fe_7Se_8$ is main active component of the electrode material of the sodium battery, and the crystallinity and content of the $Fe_7Se_8$ directly affect the electrochemical properties of the sodium battery, and therefore, the electrochemical properties of the samples prepared in the embodiments 1-2 are slightly lower than those of other embodiments, which means that no further test is made to the embodiments 1-2.

Figure 2C:
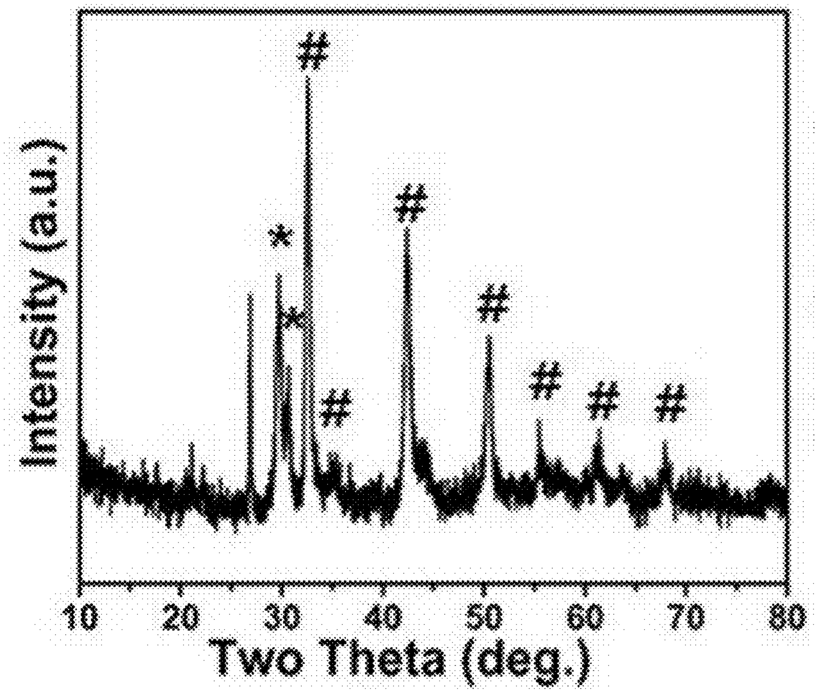
FIG. 2C illustrates an XRD pattern of a $Fe_7Se_8/Fe_3(PO_4)_2$ sample prepared in an embodiment 3 of the disclosure.

As shown FIG. 2C, it can be seen that the prepared $Fe_7Se_8/Fe_3(PO_4)_2$ sample is composed of the $Fe_7Se_8$ and the $Fe_3(PO_4)_2$ that are with good crystallinity, but there is a weak impurity peak before the peak of $Fe_3(PO_4)_2$, indicating that unknown impurities exist in the $Fe_7Se_8/Fe_3(PO_4)_2$ sample prepared in the embodiment 3. Moreover, since the content of the $Fe_7Se_8$ in the $Fe_7Se_8/Fe_3(PO_4)_2$ heterogeneous structure is relatively high with good crystallinity, thus, the $Fe_7Se_8/Fe_3(PO_4)_2$ sample prepared in the embodiment 3 is selected to perform the electrochemical performance test.

Figure 2D:
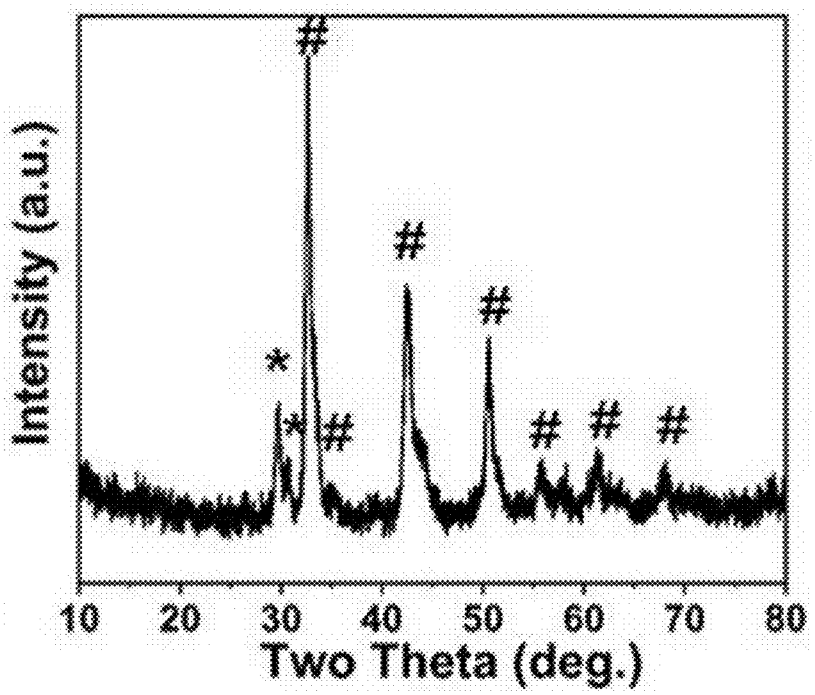
FIG. 2D illustrates an XRD pattern of a $Fe_7Se_8/Fe_3(PO_4)_2$ sample prepared in an embodiment 4 of the disclosure.

As shown in FIG. 2D, it can be detected that the prepared $Fe_7Se_8/Fe_3(PO_4)_2$ sample contains the $Fe_7Se_8$ with a good crystallinity of and a small amount of the $Fe_3(PO_4)_2$, there are no impurity peaks. The content of the $Fe_7Se_8$ in the $Fe_7Se_8/Fe_3(PO_4)_2$ heterogeneous structure is relatively high. Therefore, the $Fe_7Se_8/Fe_3(PO_4)_2$ sample prepared in the embodiment 4 is performed by electron microscope scanning image and high-resolution X-ray photoelectron spectroscopy.

Figure 2E:
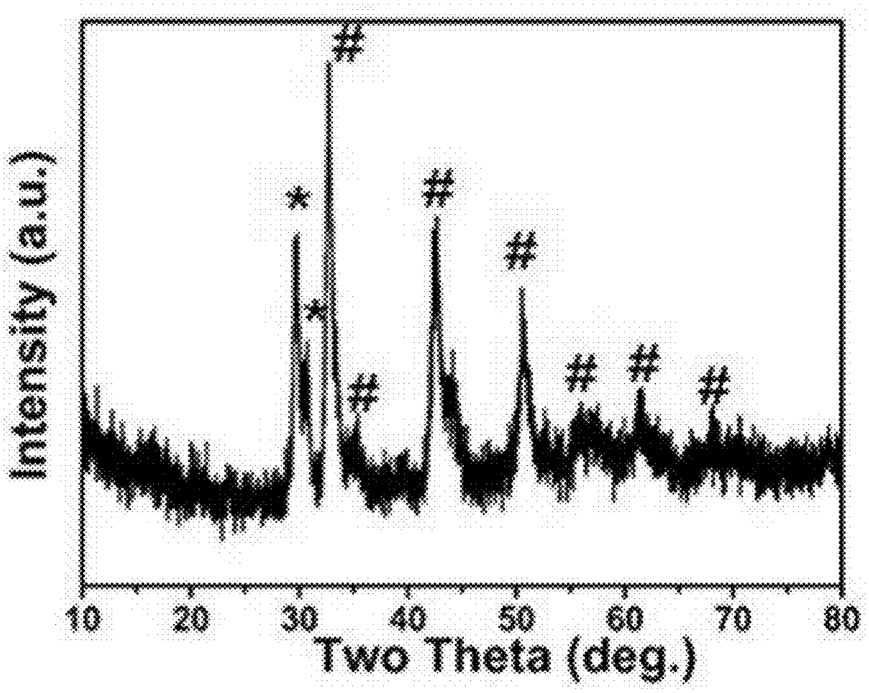
FIG. 2E illustrates an XRD pattern of a $Fe_7Se_8/Fe_3(PO_4)_2$ sample prepared in an embodiment 5 of the disclosure.

As shown in FIG. 2E, it can be seen that the prepared $Fe_7Se_8/Fe_3(PO_4)_2$ sample contains $Fe_7Se_8$ with good crystallinity and a small amount of the $Fe_3(PO_4)_2$, there are no impurity peaks, and peaks of the $Fe_7Se_8/Fe_3(PO_4)_2$ sample are approximately close to the embodiment 4 (shown in FIG. 2D). Therefore, the properties of the embodiment 5 can refer to the embodiment 4.

4. The battery performance test is performed on the $Fe_7Se_8/Fe_3(PO_4)_2$ sample prepared in the embodiment 3.

The $Fe_7Se_8/Fe_3(PO_4)_2$ sample prepared in the embodiment 3 is used as an active material of a sodium battery, a carbon nanotube is used as a conductive agent, sodium carboxymethyl cellulose is used as a binder, water is used as a solvent; and then these materials are ground into a paste and uniformly coated on a copper foil current collector. After drying under vacuum conditions, the paste is used as an anode of the sodium battery to be assembled with a sodium metal and an organic liquid electrolyte, thereby obtaining a $Na^+$ half-cell battery for the cycle performance test.

Figure 3:
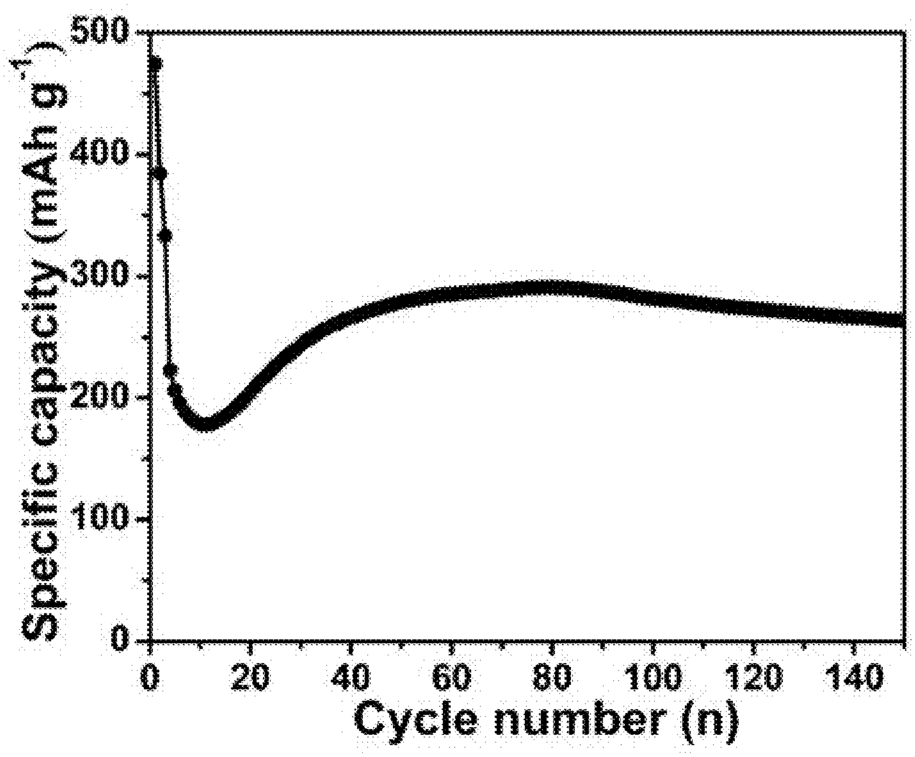
FIG. 3 illustrates a cycle performance of a $Fe_7Se_8/Fe_3(PO_4)_2$-based battery prepared in the embodiment 3 of the disclosure.

Test conditions for the electrochemical properties of the assembled $Na^+$ half-cell battery are as follows: a current density used for testing the assembled $Na^+$ half-cell battery is 1 ampere per gram ($A \cdot g^{-1}$), a voltage range used is in a range of 0.01 volts (V) to 3.0 V, and the battery cycle performance of the $Fe_7Se_8/Fe_3(PO_4)_2$ sample prepared in the embodiment 3 is shown in FIG. 3, which indicates that the cycling stability of the $Na^+$ half-cell battery is limited under the preparation conditions of the embodiment 3.

5. The $Fe_7Se_8/Fe_3(PO_4)_2$ sample prepared in the embodiment 4 is characterized by the electron microscope scanning image and the high-resolution X-ray photoelectron spectroscopy of the phosphorus element.

Figure 4:
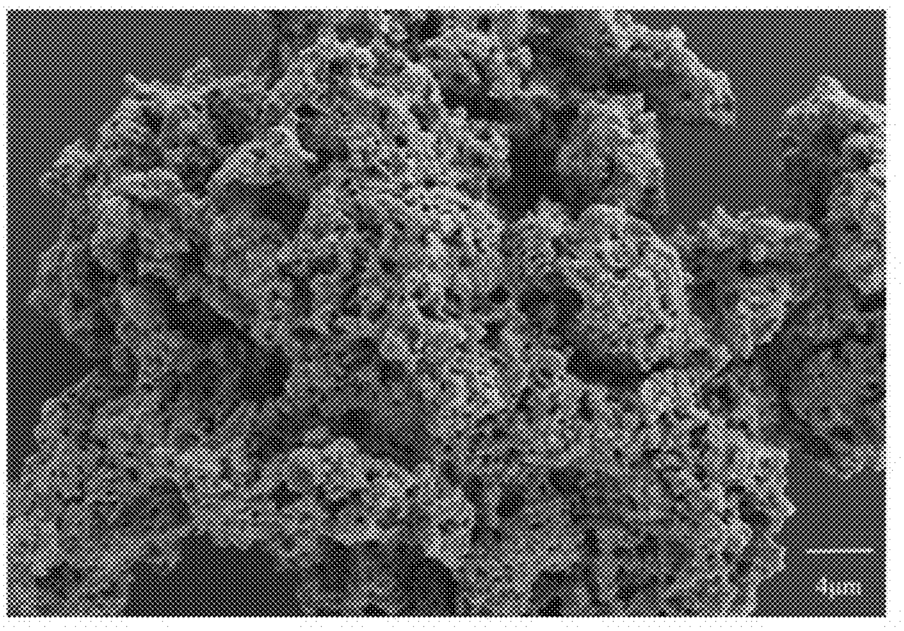
FIG. 4 illustrates a SEM image of the $Fe_7Se_8/Fe_3(PO_4)_2$ sample prepared in the embodiment 4 of the disclosure.

As shown in FIG. 4, the SEM image of the $Fe_7Se_8/Fe_3(PO_4)_2$ sample prepared in the embodiment 4 can be obtained, and it can be seen form FIG. 4 that the prepared $Fe_7Se_8/Fe_3(PO_4)_2$ sample presents a three-dimensional network structure and possesses pores.

Figure 5:
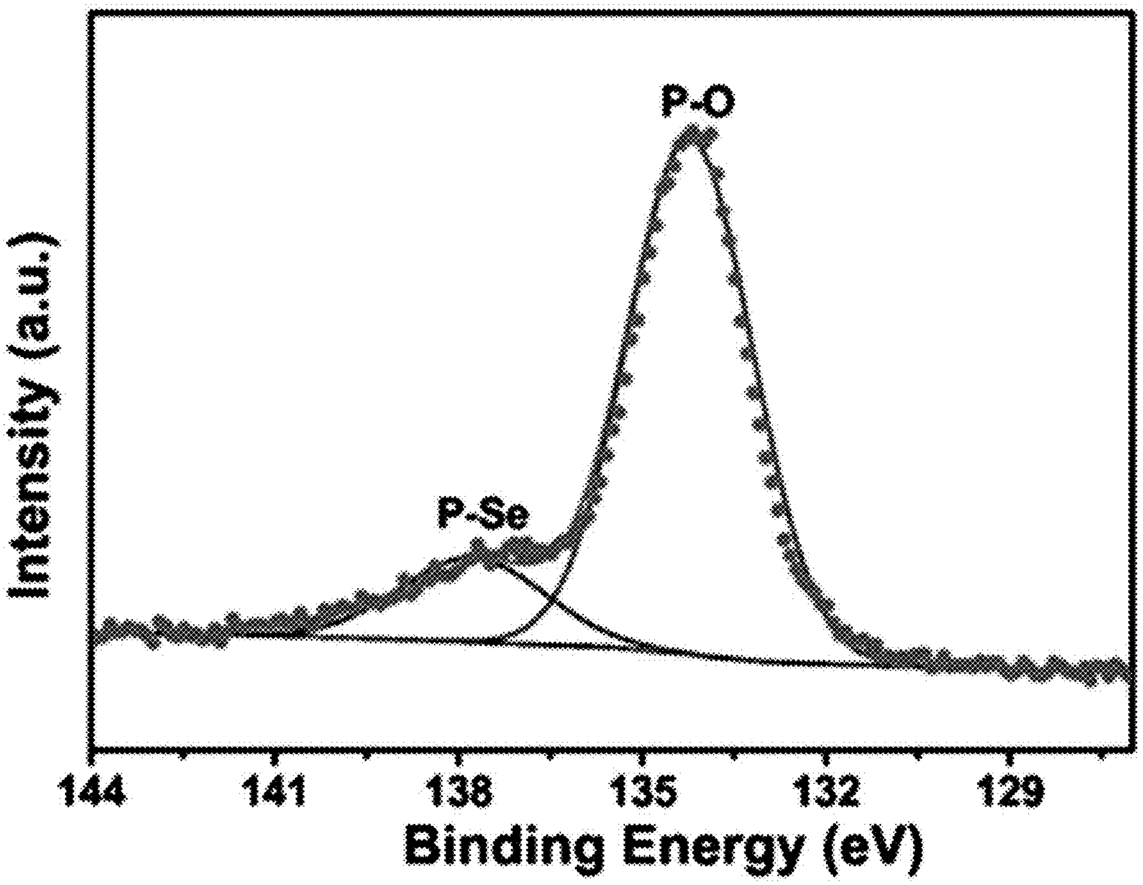
FIG. 5 illustrates a high-resolution X-ray photoelectron spectroscopy of a phosphorus element of the $Fe_7Se_8/Fe_3(PO_4)_2$ sample prepared in the embodiment 4 of the disclosure.

As shown in FIG. 5, it illustrates the high-resolution X-ray photoelectron spectroscopy of the phosphorus element of the $Fe_7Se_8/Fe_3(PO_4)_2$ sample prepared in the embodiment 4, which can observe obvious P—Se bonds and the $Fe_3(PO_4)_2$ in the $Fe_7Se_8/Fe_3(PO_4)_2$ heterogeneous structure contributes to forming the heterogeneous structure with the rich P—Se bonds in view of the electrochemical properties of the $Na^+$ half-cell battery, thereby to relieve the volume deformation of the electrode material in an electrochemical reaction process and to enhance the structural stability of the $Na^+$ half-cell battery. Therefore, it is indicated that there is a strong interaction between the $Fe_7Se_8$ and the small amount of the $Fe_3(PO_4)_2$ in the $Fe_7Se_8/Fe_3(PO_4)_2$ sample prepared in the embodiment 4.

Therefore, based on the above-mentioned detection results and in view of the good crystallinity and ideal composition of the $Fe_7Se_8/Fe_3(PO_4)_2$ sample prepared in the embodiment 4, comparative tests and characterization experiments are performed on electrochemical properties with reference to the embodiment 4.

6. The comparative tests are conducted on the rate capacity and the long cycle performance of the $Fe_7Se_8/Fe_3(PO_4)_2$ sample prepared in the embodiment 4 in view of a control example 1 and a control example 2.

Control Example 1: The spindle-shaped $Fe_2O_3$ powder obtained in the step 1 of the embodiment 4 is replaced by a commercial $Fe_2O_3$ powder, and a mass ration of the commercial $Fe_2O_3$ powder to a selenium powder is 1:3.50, and then the commercial $Fe_2O_3$ powder and the selenium powder are mixed and grounded to obtain a mixed powder, and the mixed powder and sodium hypophosphite monohydrate with a mass of 5 times of the commercial $Fe_2O_3$ powder are placed together in a tube furnace, keeping other preparation conditions unchanged to prepare a control sample 1 of bulk-phase carbon-free $Fe_7Se_8$-based $Na^+$-storage electrode material containing $Fe_7Se_8/Fe_3(PO_4)_2$.

Control Example 1: The selenium powder added in the step 2 of the embodiment 4 is removed. Namely, the spindle-shaped $Fe_2O_3$ powder and the sodium hypophosphite monohydrate are directly placed in a tube furnace at a mass ratio of 1:5, and other preparation conditions are unchanged to prepare a control sample 2 of ferrous phosphide $(FeP)/Fe_3(PO_4)_2$.

The $Fe_7Se_8/Fe_3(PO_4)_2$ sample prepared in the embodiment 4 is used as an active material of a sodium battery, and is assembled into a $Na^+$ half-cell battery according to a method as described in the battery cycle performance test, thereafter to perform another battery cycle performance test. Test conditions of electrochemical properties of the assembled $Na^+$ half-cell battery are as follows: a current density of another battery cycle performance test is in a range of 1-30 A·g-1, a voltage range of another battery cycle performance test is in a range of 0.01 V to 3.0 V, and the cycle performance thereof is shown in FIG. 6.

Figure 6:
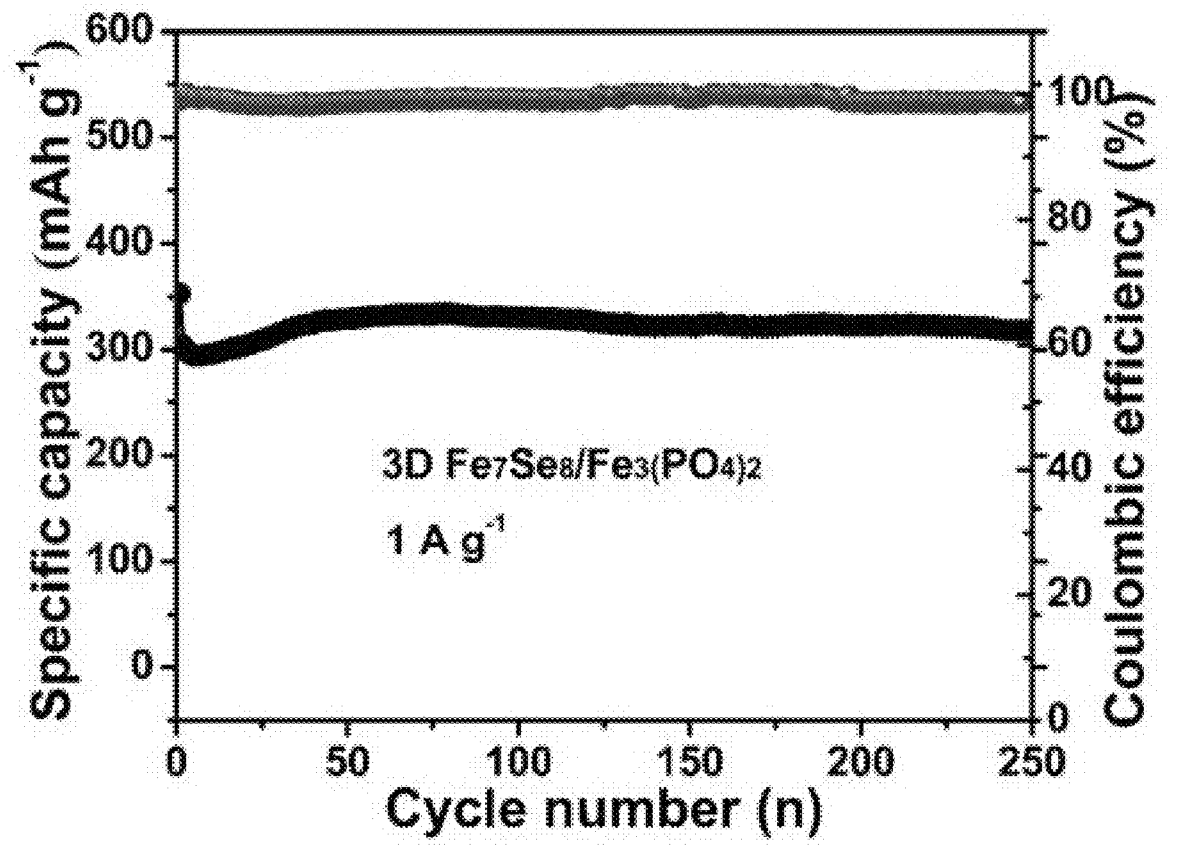
FIG. 6 illustrates a battery cycle performance of a $Fe_7Se_8/Fe_3(PO_4)_2$-based battery prepared in the embodiment 4 of the disclosure.

As shown in FIG. 6, it illustrates the cycling performance of the $Fe_7Se_8/Fe_3(PO_4)_2$ sample prepared in the embodiment 4. It can be seen from FIG. 6 that the cycle performance of the $Na^+$ half-cell battery assembled by the $Fe_7Se_8/Fe_3(PO_4)_2$ sample prepared in the embodiment 4 appears on 317.8 $mAh \cdot g^{-1}$ at the current density of 1 $A \cdot g^{-1}$ after 250 cycles, indicating that the $Na^+$ half-cell battery shows excellent cycling stability.

Figure 7:
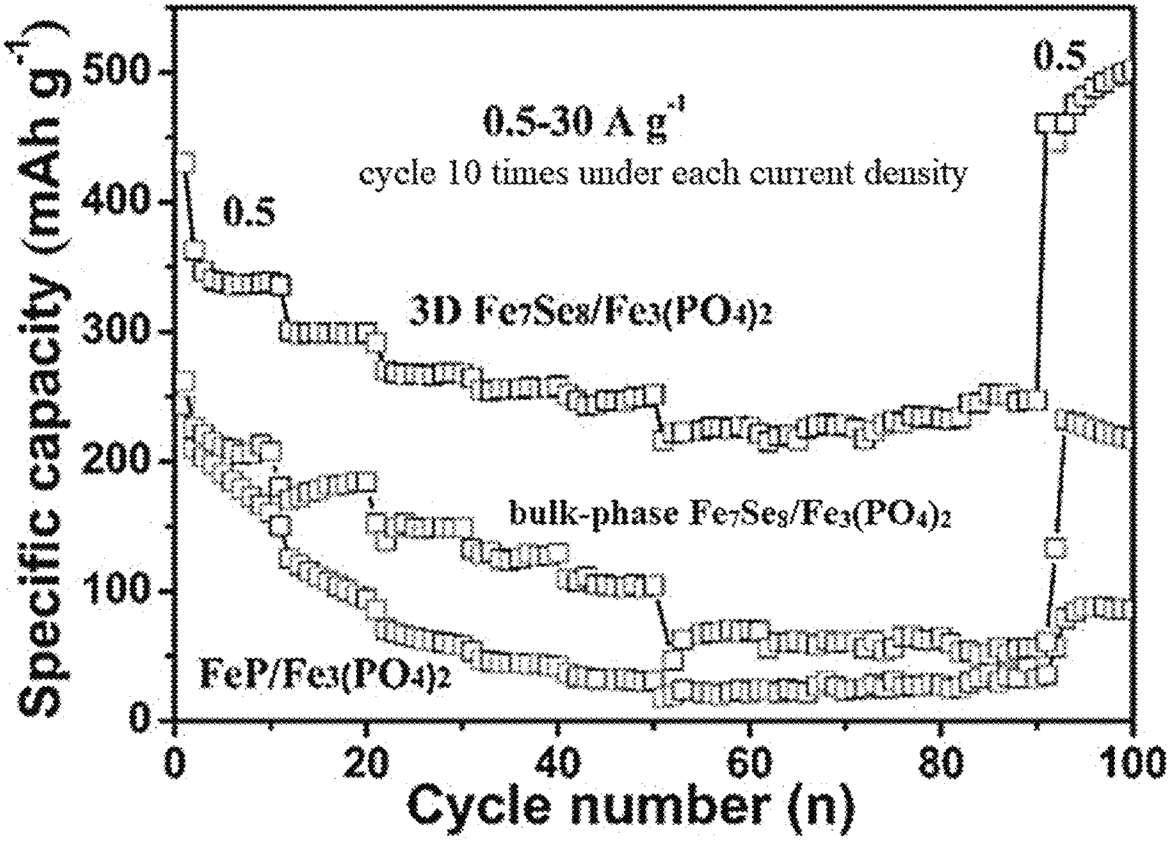
FIG. 7 illustrates a schematic diagram of rate capacities of the $Fe_7Se_8/Fe_3(PO_4)_2$ sample prepared in the embodiments 4 of the disclosure and samples of contrast examples.

The $Fe_7Se_8/Fe_3(PO_4)_2$ sample prepared in the embodiment 4, the control sample 1, and the control sample 2 are used as active materials of sodium batteries, and then are assembled into $Na^+$ half-cell batteries according to the method as described in the battery cycle performance test, thereafter to perform another battery cycle performance tests. Test conditions of electrochemical properties of the assembled $Na^+$ half-cell batteries are as follows: a current density used by rate capacity tests is in a range of 1-30 $A \cdot g^{-1}$ and a voltage range is in a range of 0.01 V to 3.0 V, and the rate capacity performances are shown in FIG. 7. Moreover, a current density used for long cycle performance tests is 5 $A \cdot g^{-1}$ and a voltage range is in a range of 0.01 V to 3.0 V. The long cycle performances are shown in FIG. 8.

As shown in FIG. 7, the rate performances of the sample prepared in the embodiment 4 and the control samples prepared in the control examples are illustrated. It can be seen from FIG. 7 that the sample prepared in the embodiment 4 shows better stability at different current densities, and when the current density reaches 30 $A \cdot g^{-1}$, the specific capacity of the sample prepared in the embodiment 4 can also reach 252.2 $mAh \cdot g^{-1}$. In addition, when the current density is recovered to 0.5 $A \cdot g^{-1}$, the reversible capacity is still very high. The properties of the sample prepared in the embodiment 4 are superior to those of the control samples, indicating that the presence of the P—Se bonds and the construction of the 3D network structure accelerates the $Na^+$ diffusion kinetics and promotes the high-rate capacity of the electrode material.

Figure 8:
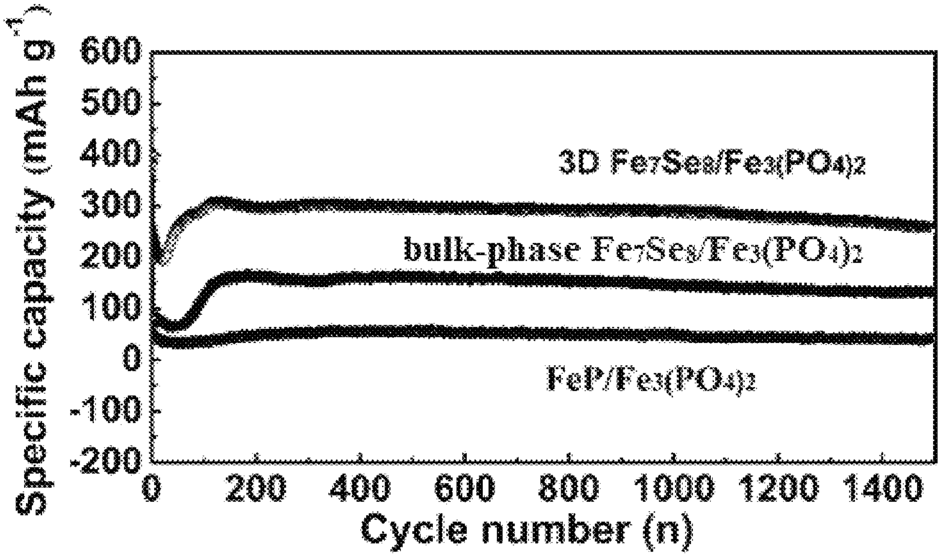
FIG. 8 illustrates long cycle performances of the $Fe_7Se_8/Fe_3(PO_4)_2$ sample prepared in the embodiments 4 of the disclosure and the samples of the contrast examples.

As shown in FIG. 8, the long cycle performances of the sample prepared in the embodiment 4 and the control samples prepared in the control examples are illustrated. It can be seen from FIG. 8 that the $Na^+$ half-cell batteries assembled by the sample prepared in the embodiment 4 and the control samples can cycle for 1500 times at a current density of 5 $A \cdot g^{-1}$. Moreover, the specific capacity of the sample prepared in the embodiment 4 is up to 266.9 $mAh \cdot g^{-1}$; its capacity retention rate reaches 95.4%, which is higher than those of the bulk-phase carbon-free material and the $FeP/Fe_3(PO_4)_2$ electrode material, indicating that the unique structure of the $Fe_7Se_8/Fe_3(PO_4)_2$ electrode material with the 3D heterogeneous structure can significantly improve the capacity and long cycling stability of the battery.

The carbon-free $Fe_7Se_8$-based $Na^+$-storage electrode material prepared by the preparation method of the disclosure has the 3D interconnected porous frame and the P—Se bond-rich heterogeneous structure; the 3D interconnected porous frame can promote rapid transmission of $Na^+$ and electrons, thereby facilitating permeation of the organic liquid electrolyte; and the P—Se bond-rich heterogeneous structure endows the iron selenide electrode material excellent with mechanical stability in sodium intercalation/deintercalation processes, and can reduce diffusion energy barrier of $Na^+$ and improve the charge migration efficiency. Therefore, the synergistic effect between the three-dimensional interconnected porous frame and the phosphorus-selenium (P—Se) bond-rich heterogeneous structure enhances electronic conductivity and the reaction kinetics of the carbon-free $Fe_7Se_8$-based $Na^+$-storage electrode material, thereby obtaining excellent long cycle stability and high-rate capacity.

The above is only used to illustrate the technical solution of the disclosure and not to limit the disclosure. Any other modifications or equivalent substitutions made by those skilled in the related art to the technical solution of the disclosure, which do not deviate from the spirit and scope of the technical solution of the disclosure, should be included in the scope of the protection of the disclosure.

What is claimed is:

1. A preparation method of a carbon-free $Fe_7Se_8$-based sodium ion ($Na^+$)-storage electrode material, comprising the following steps:

step 1, dissolving ferric chloride and ammonium dihydrogen phosphate in deionized water at a room temperature to get a mixed solution, stirring the mixed solution to obtain a clear yellow liquid, transferring the clear yellow liquid into an autoclave and performing a hydrothermal reaction on the clear yellow liquid at 120 degrees Celsius (C) to 160° C. to obtain a powder, naturally cooling the powder to the room temperature followed by washing and drying, thereby to obtain a spindle-shaped ferric oxide ($Fe_2O_3$) powder; and step 2, grinding and mixing the spindle-shaped $Fe_2O_3$ powder prepared in the step 1 with a selenium powder to get a mixed powder; placing the mixed powder and sodium hypophosphite monohydrate ($NaH_2PO_2 \cdot H_2O$) in a middle region and a front region of a tube furnace respectively, wherein a placement distance between the mixed powder and the sodium hypophosphite monohydrate in the tube furnace is in a range of 6 centimeters (cm) to 15 cm, and a mass ratio of the spindle-shaped $Fe_2O_3$ powder: the selenium powder: the sodium hypophosphite monohydrate is 1:(2-3):(5-6); and performing calcination treatment on the mixed powder and the sodium hypophosphite monohydrate in an inert atmosphere by heating the mixed powder and the sodium hypophosphite monohydrate from an initial temperature of 25° C. to a calcination temperature of 600° C.-800° C. and maintaining the calcination temperature, thereby to obtain the carbon-free $Fe_7Se_8$-based $Na^+$-storage electrode material; wherein the carbon-free $Fe_7Se_8$-based $Na^+$-storage electrode material has a three-dimensional interconnected porous frame and a phosphorus-selenium (P—Se) bond-rich heterogeneous structure.

2. The preparation method of the carbon-free $Fe_7Se_8$-based $Na^+$-storage electrode material as claimed in claim 1, wherein in the step 2, the mass ratio of the spindle-shaped $Fe_2O_3$ powder: the selenium powder: the sodium hypophosphite monohydrate is 1:2:5.

3. The preparation method of the carbon-free $Fe_7Se_8$-based $Na^+$-storage electrode material as claimed in claim 1, wherein in the step 2, the calcination temperature is 600° C., a heating speed of the calcination treatment is in a range of 2-5 degrees Celsius per minute (° C./min), and a time for maintaining the calcination temperature is in a range of 2-4 hours (h).

4. The preparation method of the carbon-free $Fe_7Se_8$-based $Na^+$-storage electrode material as claimed in claim 1, wherein in the step 1, a molar concentration ratio of the ferric chloride to the ammonium dihydrogen phosphate is 400:9.

5. The preparation method of the carbon-free $Fe_7Se_8$-based $Na^+$-storage electrode material as claimed in claim 1, wherein in the step 1, a reaction time for the hydrothermal reaction at 120° C. to 160° C. is in a range of 3-8 h, a temperature for the drying is 70° C., and a time for the drying is 12 h.

6. The preparation method of the carbon-free $Fe_7Se_8$-based $Na^+$-storage electrode material as claimed in claim 5, wherein in the step 1, a temperature for the hydrothermal reaction is 140° C., and the reaction time for the hydrothermal reaction is 5 h.

7. The preparation method of the carbon-free $Fe_7Se_8$-based $Na^+$-storage electrode material as claimed in claim 1, wherein in the step 1, the washing after the hydrothermal reaction and the naturally cooling the powder to the room temperature is performed by sequentially washing the powder using deionized water and ethanol.

8. An application method of the carbon-free $Fe_7Se_8$-based $Na^+$-storage electrode material prepared by the preparation method as claimed in claim 1 in a sodium battery, comprising:

using the carbon-free $Fe_7Se_8$-based $Na^+$-storage electrode material prepared in the step 2 as an active material of the sodium battery, using a carbon nanotube as a conductive agent, using sodium carboxymethyl cellulose as a binder, and using water as a solvent;

grinding the carbon-free $Fe_7Se_8$-based $Na^+$-storage electrode material, the carbon nanotube, the sodium carboxymethyl cellulose, and the water into a paste;

uniformly coating the paste on a copper foil current collector and then vacuum drying the paste; and using the paste after the vacuum drying as an anode of the sodium battery, and assembling the anode with a sodium metal and an organic liquid electrolyte, thereby to obtain a $Na^+$ half-cell battery.

* * * * *